United States Patent Office

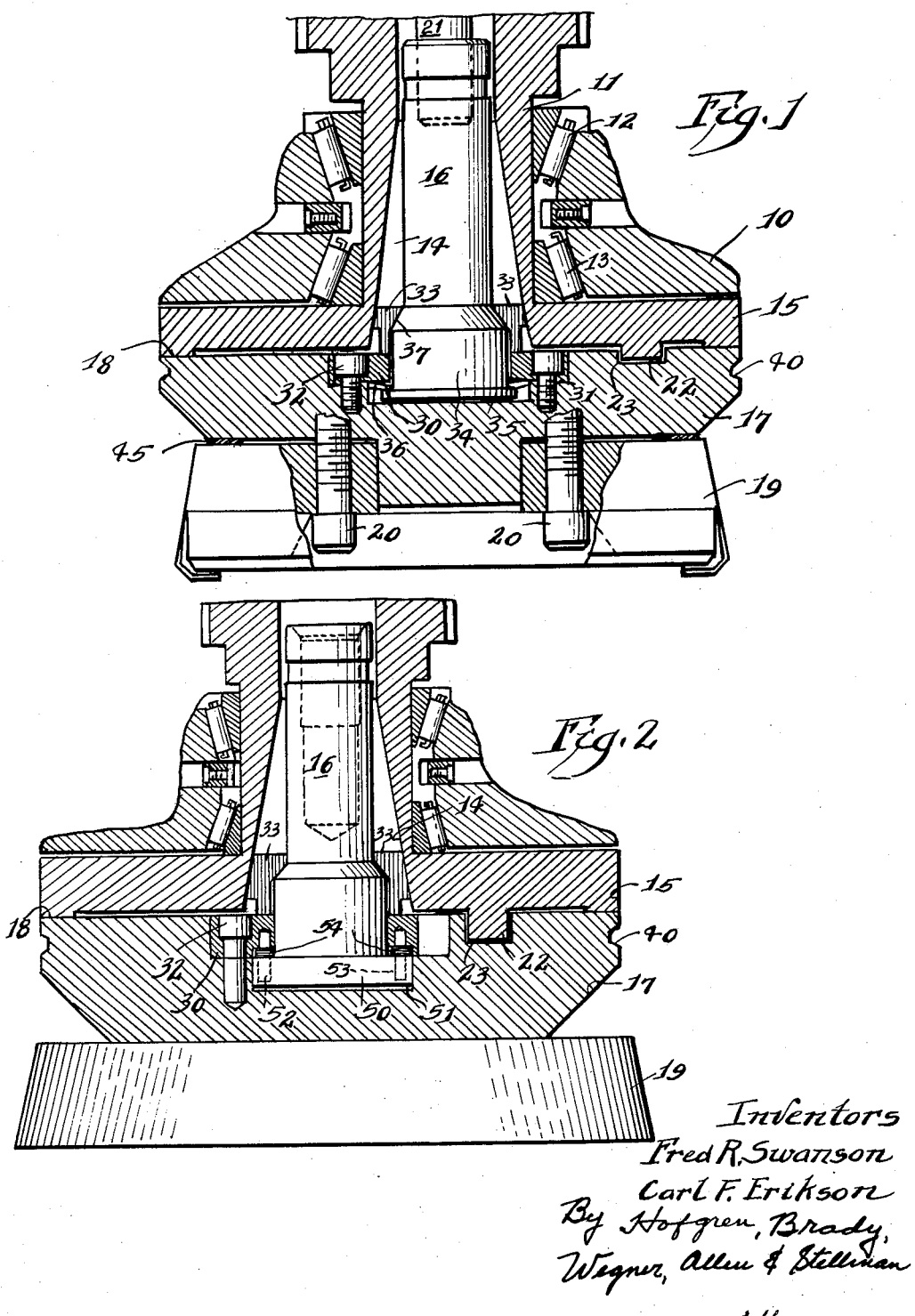

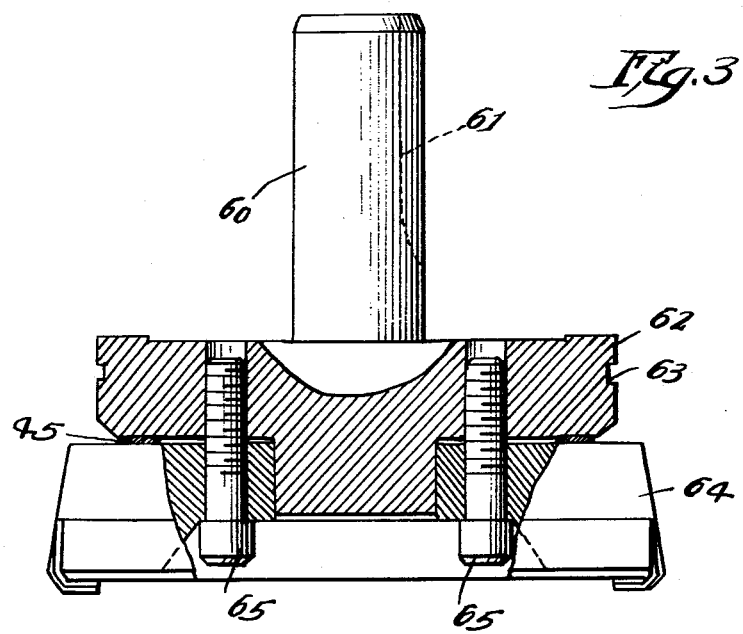
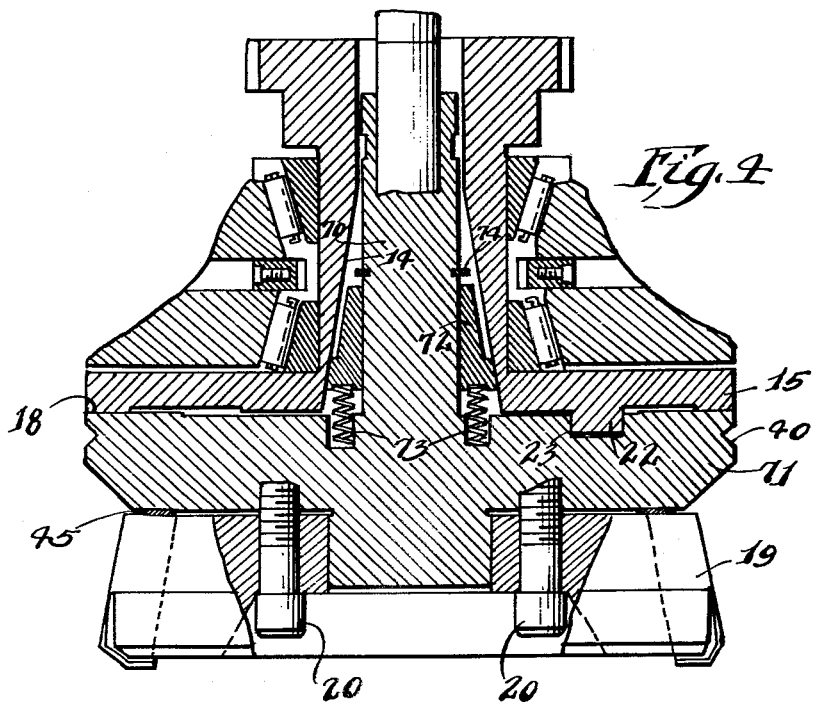

3,136,217
Patented June 9, 1964

3,136,217
FLANGED TOOL ADAPTER
Fred R. Swanson, Rockford, and Carl F. Erikson, Belvidere, Ill., assignors to Sundstrand Corporation, a corporation of Illinois
Filed Jan. 24, 1961, Ser. No. 84,576
8 Claims. (Cl. 90—11)

This invention relates to a tool supporting, handling and driving adapter and more particularly to a flanged adapter to provide support against bending loads from larger diameter or extended cutting tools.

An object of this invention is to provide a new and improved flanged adapter.

Another object of the invention is to provide a flanged tool adapter in which a cutter is previously mounted on the adapter whereby the cutter may be quickly associated with a spindle and the necessary support for the cutter derived from an abutting relation between the flange of the adapter and an exposed spindle flange.

Another object of the invention is to provide a tool supporting, driving and handling adapter comprising, a central stem or shank insertable in a spindle bore, a flange associated with said stem at an end of the latter having a periphery substantially greater than said stem to extend laterally therebeyond whereby the adapter flange has an annular area of engagement with the spindle flange to provide substantial support for the cutter.

A further object of the invention is to provide an adapter as defined in the preceding paragraph in which the spindle and adapter flanges are keyed together to transmit driving torque to the adapter and in which the adapter has means associated therewith to obtain concentricity between the axis of the spindle bore and the adapter, with at least one form of such last-mentioned means insuring that a full abutment is obtained between the flanges prior to obtaining the aforesaid concentricity.

Further objects and advantages will become apparent from the following detailed description taken in connection with the accompanying drawings in which:

FIG. 1 is a horizontal section through a spindle head and a tool supporting, handling and driving adapter mounted therein and carrying a tool such as a milling cutter;

FIG. 2 is a view similar to FIG. 1 disclosing a modification of the structure shown in FIG. 1;

FIG. 3 is an elevational view of another embodiment of the adapter usable in the cylindrical spindle bore with parts in section;

FIG. 4 is a view similar to FIG. 1 of another embodiment of the flanged adapter with a portion of the spindle shown in association therewith;

Figure 5:
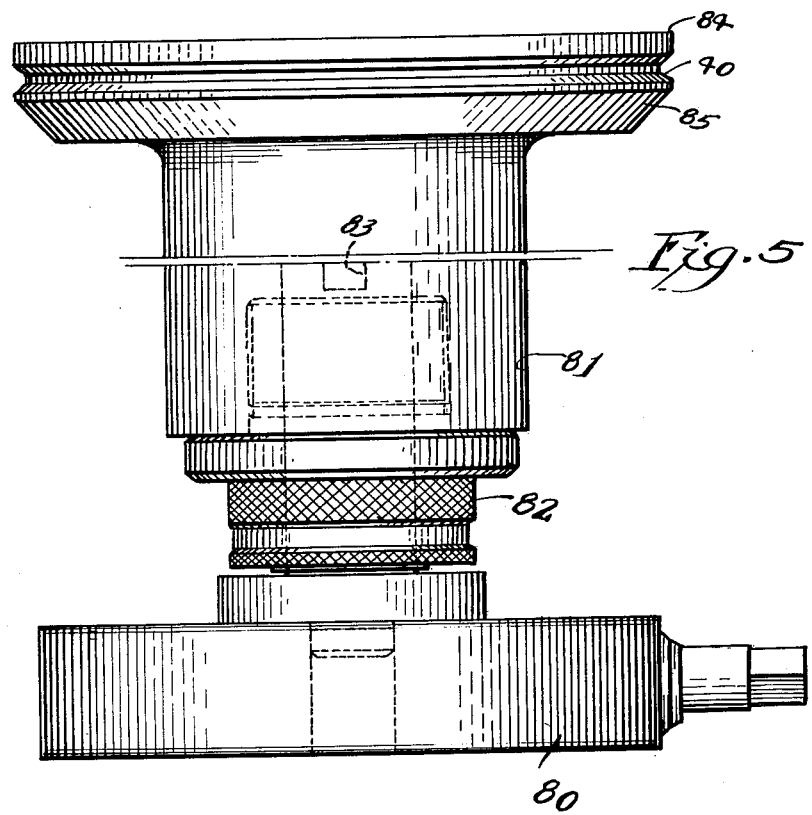
FIG. 5 is a plan view of a different embodiment of the flanged adapter with a tool extension.
Figure 6:
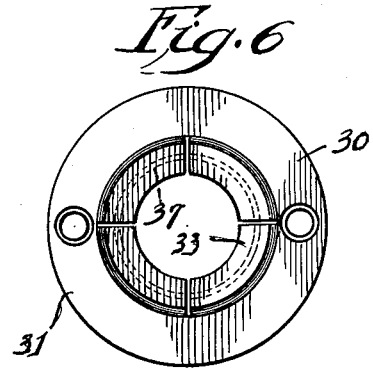
FIG. 6 is a detail view of the collet shown in FIG. 1.

While this invention is susceptible of embodiment in many different forms, there is shown in the drawings and will herein be described in detail an embodiment of the invention together with modifications thereof with the understanding that the present disclosure is to be considered as an exemplification of the principles of the invention and is not intended to limit the invention to the embodiment illustrated. The scope of the invention will be pointed out in the appended claims.

In the embodiment of FIG. 1, a machine tool head is disclosed with the head indicated fragmentarily at 10 and the spindle at 11. The spindle 11 is rotatably supported in the head by bearings 12 and 13 and is provided with a bore 14 having a taper. The spindle also has formed integrally therewith an exposed annular flange 15 extending annularly about the bore 14.

The adapter has a generally cylindrical stem or shank 16 associated with a generally cylindrical flange 17 of a diameter substantially greater than that of the stem 16, whereby as shown in FIG. 1 with the stem 16 positioned within the spindle bore, the adapter flange 17 makes contact with the spindle flange 15 in an annular area indicated at 18. The abutment between the spindle flange 15 and the adapter flange 17 provides support for a large diameter cutter such as a milling cutter 19 secured to the adapter flange by machine screws 20.

The adapter is drawn into the spindle by the action of a conventional draw rod 21 engageable in an end of the adapter stem 16 and during this step engagement is made between a key 22 on and extending beyond the exposed face of the spindle flange 15 and a recess 23 in the adapter flange shaped to receive the key 22, whereby driving torque is transmitted from the spindle to the adapter.

Means are provided to locate the adapter concentrically with the axis of the spindle bore comprising an annular member in the form of an expanding collet 30 having an annular base 31 secured to the adapter flange by machine screws 32 and collet fingers 33 formed integrally with the base and separated from each other to form flexible members which define an annular expanding collect section. The annular collet section has an external taper matching the taper of the spindle bore 14 and is sized to contact the spindle internal surface at the same time flanges 15 and 17 contact.

The adapter stem 16 has a plug 34 positioned within the collet 30 with a flange 35 overlapping the collet base 31 and normally spaced therefrom with a spring washer 36 disposed therebetween. The plug 34 also has a cam surface 37 selectively engageable with a similarly shaped surface on the interior of the annular collet section whereby relative movement of the plug with respect to the collet in one direction results in engagement therebetween and expanding the collet fingers 33 outwardly against the spindle taper if necessary.

The adapter flange 17 additionally has a generally V-shaped groove 40 extending about the periphery thereof to facilitate handling and supporting of the adapter by means such as a loading device engageable in the groove to transport the adapter and hold the adapter in storage until use thereof in the machine tool is desired.

In utilizing the adapter, the stem 16 is inserted within the spindle bore and the draw rod 21 draws the stem inwardly of the bore to make the engagement 18 between the spindle flange 15 and the adapter flange 17 to align the axes of the spindle flange and the adapter flange. At this time, the collet engages the spindle and expansion of the collet is prevented by the spring washer 36 resisting relative movement between the collet and the stem plug 34 which are out of contact. When the force exerted by the draw rod exceeds the resisting force of the spring subsequent to the engagement of the flanges, the spring is compressed to permit movement of the stem 16 relative to the collet which causes the cam surface 37 on the stem to engage the collet fingers and expand them, if necessary, to obtain concentricity of the adapter with the spindle bore. Continued tightening will only make a tighter assembly.

In order to provide a predetermined over-all length for the adapter and cutter, shims 45 are positioned between the adapter flange 17 and the cutter 19.

In the embodiment of FIG. 2, parts similar to those described in connection with the embodiment of FIG. 1 have been given the same reference numerals. In this embodiment, the construction differs in the form of lost motion connection between the stem 16 and adapter flange 17. The adapter stem 16 has a flange 50 located beyond the base 31 of the collet and within a recess 51 in the adapter flange 17. A pair of pins 52 and 53 extend into the base 31 of the collet and through apertures (not shown) in a plurality of spring washers 54 located between the stem flange 50 and the collet base 31. The pins 52 and 53 locate the spring washers and loosely fit within openings in the flange 50 to permit movement between this flange and the collet.

In the embodiment of FIG. 3, a flanged adapter is disclosed suitable for use with a cylindrical spindle bore and embodies an adapter stem 60 having a keyway 61 for for receiving a key in the spindle and an integral adapter flange 62 having the tool supporting and handling groove 63. A tool such as the milling cutter 64 is attached to the flange of the adapter by machine screws 65. This adapter is suitable for use with the spindle disclosed in our prior copending application, Serial No. 59,236, filed September 29, 1960, in which a collet is mounted within the spindle, for holding the adapter in operative association with the spindle.

In the embodiment of FIG. 4, the adapter has a stem 70 formed integrally with an adapter flange 71 with the stem having an annular centering sleeve 72 surrounding the stem and movable relative thereto. The annular centering sleeve is urged along the stem in a direction away from the flange 71 by means of springs 73 located between the adapter flange 71 and the sleeve 72 with the movement of the sleeve being limited by a stop ring 74 attached to the stem 70, at a location beyond the sleeve. The centering sleeve results in obtaining concentricity between the axes of the spindle bore and the adapter. Parts similar to those of the embodiment of FIG. 1 have been given the same reference numeral in the embodiment of FIG. 4.

In this embodiment, the spindle flange 15 and the adapter flange 71 abut after the aforesaid concentricity is obtained.

In the embodiment of FIG. 5, an extension of the spindle is obtained to provide for use of small standard tools in extended position. With such a device, it is important that the mounting provide maximum strength to resist bending loads and maximum concentricity between the spindle and the tool mounting means.

A typical tool, such as a boring tool 80, is carried by a boring bar extension 81 of suitable length for the job to be performed and is secured to the boring bar extension 81 by a standard collet type chuck 82 with the boring bar extension 81 carrying a stop button 83 at a known distance from a face 84 of an adapter flange 85. In this manner, tools having a known over-all length can be used at a predetermined length from the face of the spindle flange against which the adapter face 84 abuts. In this embodiment, the adapter flange 85 is similar to that in the embodiment of FIG. 1 and the adapter also includes the stem and associated expanding collet construction disclosed in the embodiment of FIG. 1.

We claim:

1. An adapter for supporting a tool for use with a spindle having a bore and an exposed spindle flange surrounding the bore comprising, an adapter body with a stem positionable within a spindle bore and a flange at an end of the stem of a size to abut said spindle flange and have an annular area of engagement with said spindle flange, an expanding collet surrounding the stem and having an external taper to engage a corresponding taper in the spindle bore and locate the adapter concentrically of the spindle bore, said collet being attached to the adapter flange and said stem being axially movable relative to said flange, a plug at an end of the stem interiorly of said collet, a lost motion connection between the stem and the adapter flange including spring means resisting movement of said connection to insure abutment between said flanges, and a cam surface on the plug engageable with the collet interiorly thereof to expand the collet upon relative movement between the stem and collet.

2. An adapter for supporting a tool for use with a spindle having a bore and an exposed spindle flange surrounding the bore comprising, an adapter body with a smooth stem slidably operably positionable within a spindle bore and a flange at an end of the stem of a size to abut an exposed flange of the spindle and have an annular area of engagement with said spindle flange and adapted to carry a cutting tool, an annular centering sleeve surrounding the stem and slidable thereon, said sleeve having an external taper to engage a corresponding taper of the spindle bore to center the adapter in the bore and means for urging said sleeve in a direction to move the sleeve inwardly of a spindle bore.

3. A tool supporting adapter comprising a stem extending centrally from one face of a flange with the flange having a larger periphery than the stem, an annular expanding collet surrounding the stem and having an external taper, said collet being secured to said flange, a plug at an end of the stem disposed within the collet, means defining a lost motion connection betwen the collet and plug including spring means to resist movement in one direction of said connection, and a cam surface on said plug engageable with the collet for expansion of the collet when the plug moves relative thereto.

4. A tool supporting, handling and driving adapter usable with a machine tool having a spindle, the spindle having a bore for receiving the adapter and an exposed spindle flange surrounding said bore, said adapter having an integral stem and flange with said stem extending generally normal from one side of said flange, said stem being positionable in the spindle bore and providing the sole means for holding the adapter in the spindle with one face of the adapter flange abutting the spindle flange, the adapter flange having a periphery substantially greater than the stem to provide a wide area of contact between the flanges, the side of the adapter flange opposite the stem providing a clear tool supporting face to abut a cutting tool area whereby a tool is supported directly from the spindle flange through the adapter flange to provide bending stiffness for a tool, and a shaped surface on the outer periphery of the adapter flange engageable by handling mechanism for positioning and transport of the adapter.

5. A tool supporting, handling and driving adapter usable with a machine tool having a spindle, the spindle having a bore for receiving the adapter and an exposed spindle flange surrounding said bore, said adapter having an integral cylindrical stem and cylindrical flange and said stem extending generally normal from one side of said flange, said stem being positionable in the spindle bore and providing the sole means for holding the adapter in the spindle with one face of the adapter flange abutting the spindle flange, the adapter flange having a diameter at least twice the diameter of the stem to provide a wide annular area of contact with the spindle flange sufficient to provide bending stiffness for the adapter, and a generally V-shaped groove on the outer periphery of the adapter flange engageable by handling mechanism for positioning and transport of the tool.

6. An adapter for use in a machine tool having a head with a spindle having an exposed flange and a bore centrally of said flange, said adapter comprising a flange of a size to engage against said spindle flange and a cylindrical body portion extending from one side of said adapter flange for placement in said spindle bore with said flanges in engagement, slidable means on said cylindrical body portion for frictionally holding said adapter operatively associated with said spindle, and a lost motion connection between the adapter flange and said body portion whereby the adapter flange is fully engaged against the spindle flange before completion of movement of the body portion into the spindle bore.

7. A tool supporting, driving and handling adapter comprising, a central stem insertable in a spindle bore, a flange associated with said stem at an end of the latter having a periphery substantially greater than said stem to extend laterally therebeyond, an annular part of said flange having a groove facilitating handling of the adapter, and an annular member surrounding and movably mounted on the stem and having an external taper.

8. An adapter as defined in claim 7 in which said annular member is an expanding collet and a lost motion connection is provided to cause expansion of the collet in response to movement of the stem relative to said flange.

References Cited in the file of this patent

UNITED STATES PATENTS

| | | |
|---|---|---|
| 2,361,324 | Severson | Oct. 24, 1944 |
| 2,828,672 | McMullen | Apr. 1, 1958 |
| 2,937,575 | McCoskey | May 24, 1960 |
| 2,955,488 | Philip et al. | Oct. 11, 1960 |
| 3,041,898 | Better | July 3, 1962 |